US010932180B2

(12) United States Patent
Hassan et al.

(10) Patent No.: US 10,932,180 B2
(45) Date of Patent: Feb. 23, 2021

(54) ROUTE PLANNING USING CROWD-SOURCED NETWORK DATA

(71) Applicant: Microsoft Technology Licensing, LLC, Redmond, WA (US)

(72) Inventors: Amer Aref Hassan, Kirkland, WA (US); Hooman Shiranimehr, Sammamish, WA (US); Ronald F. Johnson, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/518,133

(22) Filed: Jul. 22, 2019

(65) Prior Publication Data
US 2021/0029612 A1    Jan. 28, 2021

(51) Int. Cl.
*H04W 40/12* (2009.01)
*H04W 4/029* (2018.01)
*H04W 40/20* (2009.01)
*H04W 24/10* (2009.01)

(52) U.S. Cl.
CPC .......... *H04W 40/12* (2013.01); *H04W 4/029* (2018.02); *H04W 24/10* (2013.01); *H04W 40/20* (2013.01)

(58) Field of Classification Search
None
See application file for complete search history.

(56) References Cited

U.S. PATENT DOCUMENTS

| 6,961,368 | B2 | 11/2005 | Dent et al. |
| 8,644,225 | B2 | 2/2014 | Chen et al. |
| 8,706,131 | B2 | 4/2014 | Winters |
| 9,439,205 | B1 | 9/2016 | Lin et al. |
| 9,462,544 | B2 | 10/2016 | Jorguseki et al. |
| 9,510,251 | B2 | 11/2016 | Sidhu et al. |
| 9,565,609 | B2 | 2/2017 | Kuusilinna et al. |
| 9,775,001 | B2 | 9/2017 | Dunkin et al. |
| 2004/0017310 | A1 | 1/2004 | Vargas-Hurlston et al. |
| 2009/0005097 | A1 | 1/2009 | Shaffer et al. |
| 2013/0053054 | A1 | 2/2013 | Lovitt et al. |

(Continued)

FOREIGN PATENT DOCUMENTS

| WO | 2013049060 | 4/2013 |
| WO | 2016106077 | 6/2016 |

OTHER PUBLICATIONS

"Google Fi", [online]. [retrieved on Nov. 28, 2018]. Retrieved from the Internet: URL: https://web.archive.org/web/20181128222927/ https:/fi.google.com/about/faq/>, (Nov. 28, 2018), 6 Pages.

(Continued)

*Primary Examiner* — Hong S Cho
(74) *Attorney, Agent, or Firm* — Schwegman Lundberg & Woessner, P.A.

(57) ABSTRACT

Techniques for providing suggested routes for computing devices planning to travel between start and end locations are disclosed herein. In an example, crowd-sourced data is used to generate a network map that includes network parameters mapped to one or more geographical locations. The network map is used to generate suggested routes for a computing device planning to travel between the start location and the end location. The suggested routes may be generated using an optimization function to minimize travel time and optimize network connection parameters.

20 Claims, 8 Drawing Sheets

(56) References Cited

U.S. PATENT DOCUMENTS

| | | |
|---|---|---|
| 2014/0163849 A1 | 6/2014 | Adam et al. |
| 2014/0257695 A1 | 9/2014 | Annapureddy et al. |
| 2014/0269618 A1 | 9/2014 | Surface et al. |
| 2015/0017985 A1 | 1/2015 | Safavi |
| 2015/0105116 A1 | 4/2015 | Schmidt et al. |
| 2015/0257059 A1 | 9/2015 | Hirudayaraj et al. |
| 2015/0319660 A1 | 11/2015 | Helbert |
| 2016/0029279 A1 | 1/2016 | Bellamkonda et al. |
| 2016/0282129 A1* | 9/2016 | Wang .................... H04W 4/024 |
| 2017/0162057 A1 | 6/2017 | Ross et al. |
| 2017/0314940 A1 | 11/2017 | Dave et al. |
| 2017/0328725 A1* | 11/2017 | Schlesinger ....... G01C 21/3484 |
| 2018/0023968 A1* | 1/2018 | Stuchfield .......... G01C 21/3655 |
| | | 701/416 |
| 2018/0324086 A1* | 11/2018 | Lingafelt ................ H04L 45/38 |
| 2019/0056232 A1 | 2/2019 | Wang et al. |

OTHER PUBLICATIONS

"IBM and Ericsson Announce Research Advance for 5G Computer Networks", (Feb. 7, 2017), 2 Pages.

"Google Wifi and Cloud Services", [online]. [retrieved on Apr. 17, 2019]. Retrieved from the Internet: <URL: https://support.google.com/wifi/answer/6246642?>, (2019), 5 Pages.

"International Search Report & Written Opinion Issued in PCT Application No. PCT/US20/034603", dated Aug. 27, 2020, 12 Pages. (MS# 406924-WO-PCT).

* cited by examiner

ROUTE PLANNING USING CROWD-SOURCED NETWORK DATA

TECHNICAL FIELD

This document pertains generally, but not by way of limitation, to wireless networking, and particularly but not by way of limitation to planning travel routes for computing devices based on network availability and quality.

BACKGROUND

Several applications exist for users to plan travel routes in order to minimize a total travel time between start and end locations. These applications may provide several alternative routes based on type of road, predicted vehicle traffic, construction, or other travel considerations. The user can then select a desired route and follow that route to travel between the start and the end locations. While travelling along a planned route, user devices and other computing devices may desire to access various types of data through various wireless networks. Network connectivity can vary greatly depending on geographical location. For some users, reliable network connectivity may be of utmost importance while travelling between the start and end locations.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which.

DETAILED DESCRIPTION

System and methods are disclosed herein that utilize crowd-sourced network maps indicative of one or more network parameters and/or indicators for various geographical locations to generate suggested travel routes. A suggested route may be generated for a computing device planning to travel from a start location to an end location. In one example, an optimization function may be used to generate the suggested route to minimize a travel time and optimize a network connection parameter between the start and the end locations. In some examples, the network connection parameter to optimize is based upon the user's intended use of the network. For example, if the user intends to make a Voice over Internet Protocol (VoIP) call, the system may seek to plan a route so as to minimize travel time and latency. The new suggested route may be generated while the computing device is travelling along a previously selected route using an updated network map, advertised connections from other computing devices traveling along similar routes, or any other new or updated information received while the computing device is travelling a selected route. In some examples a current context, such as a time of day, day of the week, date, season, traffic indicators/conditions, weather condition, travel velocity, or user device property may be considered when generated the suggested routes.

Figure 1:
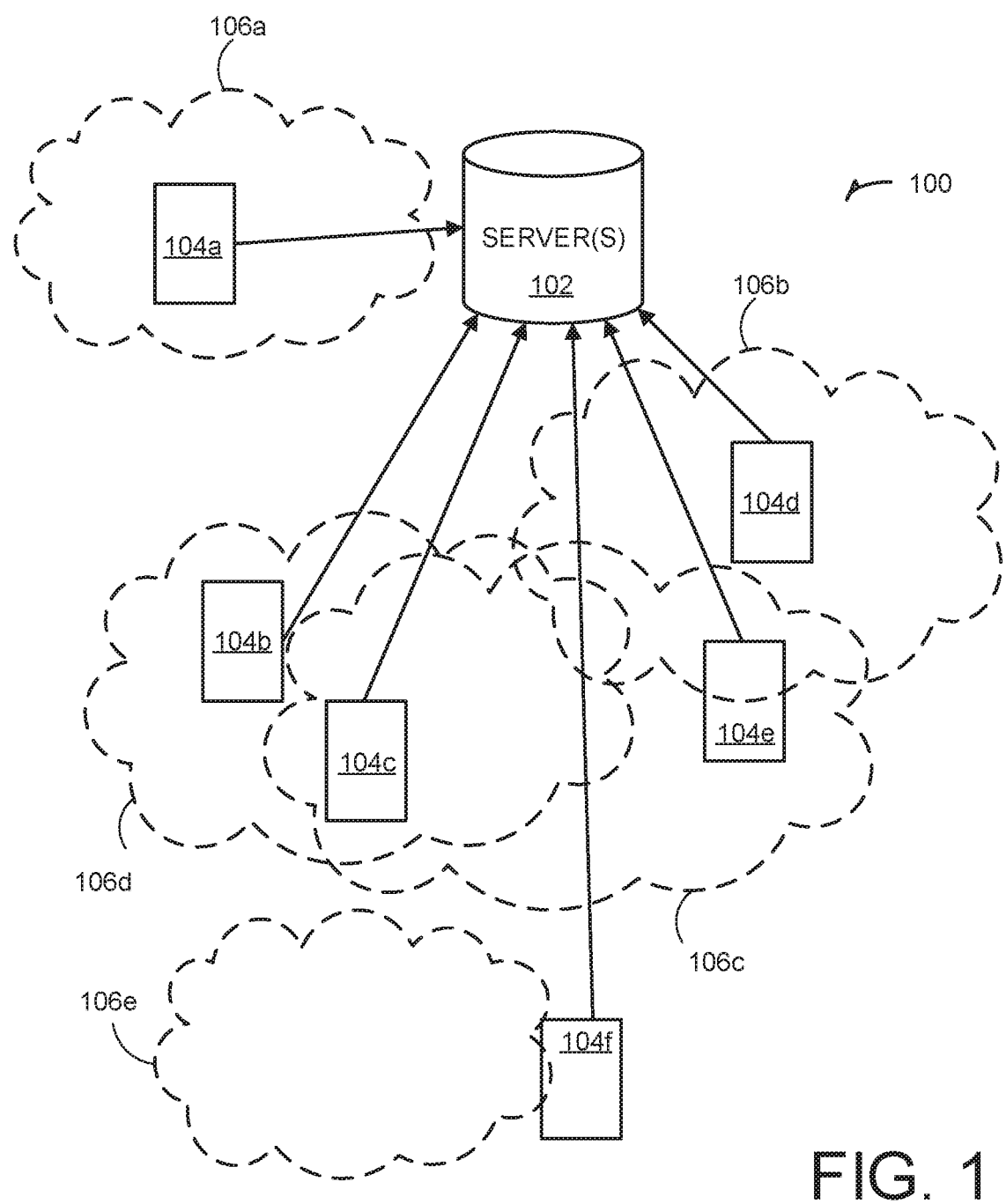
FIG. 1 is a diagram illustrating an example system for crowd-sourcing network connectivity data.

FIG. 1 is a diagram illustrating an example system 100 for crowd-sourcing network connectivity and quality data. The system 100 includes one or more servers 102 and user devices 104a-104f accessing one or more wireless networks 106a-106e. The user devices 104a-104f may be any user devices travelling along one or more geographical routes while accessing the one or more wireless networks 106a-106e. The wireless networks 106a-106e may be cellular networks, local area networks, wide area networks, or any other wireless networks. For example, the wireless networks 106a-106e may include one or more 3rd generation (3G), 4th generation (4G), long term evolution (LTE), 5th generation (5G) or any other cellular network, wireless networks according to the Institute of Electrical and Electronics Engineers (IEEE) 802.11 family of standards known as Wi-Fi®, IEEE 802.16 family of standards known as WiMax®, IEEE 802.16.4 family or any other wireless network. Each of the wireless networks 106a-106e may be configured to communicate with one or more of the user devices 104a-104f on one or more network channels. The channels may be frequency channels, for example, defined by the wireless standard for which the respective network communicates. While illustrated as five wireless networks 106a-106e and six user devices 104a-104e, any number of user devices may provide data regarding any number of wireless networks.

The user devices 104a-104f may be configured to communicate with the servers 102 through any connection, including wired and wireless connections. Each user device 104a-104f, which may be a phone, tablet, laptop, wearable device or other personal computing device, may be configured to upload data to, and download data from, the servers 102. Each user device 104a-104f may upload to the servers 102 current location data along with data that includes one or more network parameters regarding one or more of the wireless networks 106a-106e. These network parameters can include, for example, network type, channel availability, channel quality, network availability, network download speeds, network upload speeds, voice availability, voice quality, and any other parameters or indicators for each respective network. The user devices 104a-104f may communicate the network parameters to the servers 102 through the respective networks 106a-106e for which the respective user device 104a-104f is reporting, or through another network. For example, a user device may report voice connection availability to the servers 102 over a data connection. The data may be uploaded to the servers 102 in real time, or may be stored by a respective user device 104a-104f and uploaded to the servers 102 at a later time. The user devices 104a-104f may also upload contextual data with the network parameters. The contextual data may specify a context in which the network parameters were obtained. This context may be temporal, for example, specifying a time of day, day of the week, date, season, or the like, or may include other contextual data such as traffic conditions, weather conditions, travel velocity, device properties, and the like.

The servers 102 may include one or more applications configured to collect the network quality data from the user devices 104a-104f and compile a "crowd-sourced" network map for one or more geographical areas. For example, the network quality data may be provided to the servers 102 along with current geographical information, such as latitude and longitude coordinates. The network map may be a model of the wireless networks 106a-106e stored in a database with geographical coordinates mapped to specific networks 106a-106e and respective network quality data. The data can be grouped into geographical areas of any size based on the coordinates, such as city blocks, sections of a highway, or any other specified geographical area.

Figure 2:
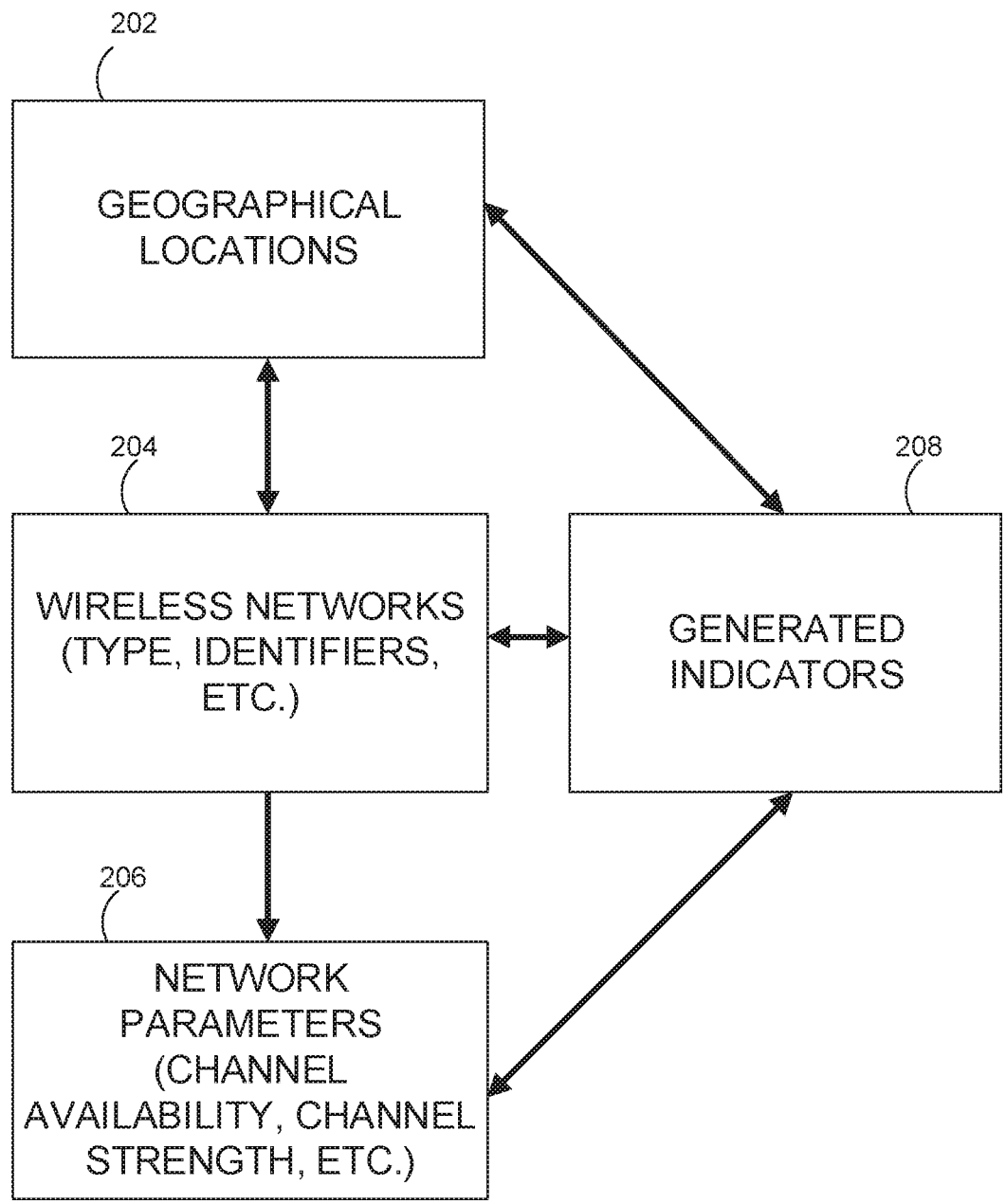
FIG. 2 is a logical diagram illustrating a network map generated using crowd-sourced network data.

FIG. 2 is a logical diagram illustrating a network map 200 generated using crowd-sourced network quality data. The network map may store and map geographic locations 202, networks 204, and network parameters 206, for example, to one another. In other examples, further crowd-sourced data may be stored related to one or more wireless networks. The geographic locations 202 can include coordinates (such as latitude and longitude), and/or geographic areas such as city blocks, parcels of land, portions of highway, or any other geographically defined area.

The geographic locations 202 may map to one or more networks 204. For example, if a network is available for a specific geographic location, the respective network can be mapped to that geographic location (and/or that geographic location can be mapped to that network). The networks 204 may include data such as network identifiers, network type, and any other data specific to a wireless network. Each wireless network of the networks 204 can also map to one or more network parameters. The parameters can include network availability, channel availability, channel stability, channel strength, and any other parameters or indicators regarding respective wireless networks.

The information for the network map 200 may be stored in one or more databases in any desirable format. The network map 200 may be generated by the servers 102 or any other computing system using the crowd-sourced data received from the user devices 104a-104f. The network map may also generate and store indicators 208 generated by the servers 102 regarding the geographical locations 202, networks 204, and or parameters 206. In one example, the indicators 208 may include a list of all network outages for a respective wireless network 106a-106e for each geographical area. In another example, the indicators 208 may include a network quality indicator for each wireless network and/or channel for each geographical area. For example, for each channel of a network for each geographic area, the network map may include an indicator between 0 and 10, 0 for no connectivity and 10 for great connectivity. In another example, the indicators 208 may be a simple binary yes or no regarding whether or not a type of network is available for a respective geographical area. In some examples, the indicators may be generated using machine learning or any other algorithms.

The indicators 208 can also be generated to provide multiple indications for a respective network or channel. For example, each channel of a respective network can be assigned a score for each of various categories. In an example, the categories can include bandwidth, latency, throughput, jitter, error rate, and/or any other network performance categories. In an example, multiple user devices 104a-104e can provide data regarding a respective channel for a respective geographical area. The respective channel may then be scored using the data. These scores may then be used to inform connection choices by computing devices, for example. In an example, for users desiring to use Voice over Internet Protocol (VoIP) it may be desirable to know which channels have low latency, whereas for users streaming data, it may be desirable to know which channels have high bandwidth. Therefore, these indicators 208 may be used by one or more applications to plan network connections for computing devices traveling through the geographical locations 202.

The indicators 208 can also include context data mapping one or more contexts to one or more network parameters. For example, the context data may be temporal, mapping the network parameters to a time of day, day of the week, data, season, or the like. The context data may also indicate non-temporal context, such as power data, traffic conditions, weather conditions, device properties, travel velocities, and the like. For example, a user device 106a-106e could upload data regarding the current power and/or power consumption of the user device or other device properties/capabilities when uploading the network quality data.

Figure 3:
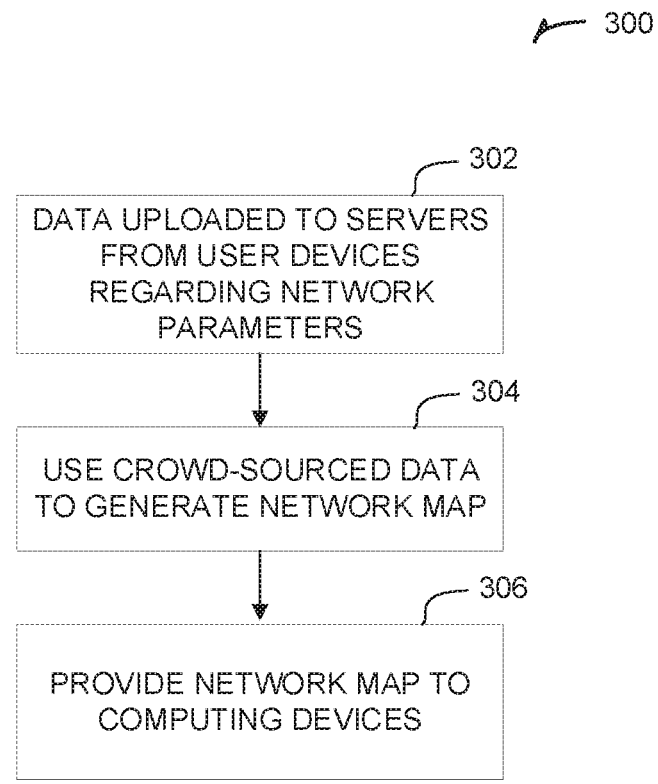
FIG. 3 is a flowchart illustrating a method of generating a network map using crowd-sourced data.

FIG. 3 is a flowchart illustrating a method 300 of generating a network map. The method 300 can be executed by the servers 102, a user device 104a-104f, or any other computer system. At step 302, user devices, such as phones, tablets, laptops, wearable devices, and other user devices, upload information regarding one or more parameters of a network for which a respective user device is connected. For example, a user device may be connected to a cellular network and using a cellular voice connection and/or a cellular data connection. In another example, the user device may be connected to a local area network or wide area network using any wireless protocol such as the IEEE 802.11 family of standards known as Wi-Fi®, IEEE 802.16 family of standards known as WiMax®, or any other network standard. In other examples, the device may be connected to another type of wireless network. In some examples, the user device may provide information regarding one or more parameters of networks and/or channels for which the respective user device is not connected. For example, service-set-identifiers (SSIDs) and signal strengths of nearby Wi-Fi® networks.

A respective user device may provide the device's geographical location, the cellular or other wireless network to which the device is wirelessly connected, the wireless channel through which the device is connected to the wireless network, a connection quality, and other parameters regarding the respective network. The device's location may be provided using geographic coordinates, such as latitude and longitude using the Global Positioning System (GPS), for example, an area descriptor, such as an intersection of two roads, or any other geographic data indicative of a device location. The connection quality may be a signal-to-noise ratio, an indication regarding successful connection, or any other indicator of connection quality. The user device may provide similar data regarding voice connection quality. In some examples, the device may provide a current navigational route the user device is travelling that was entered by the user.

At step 304, the collected data is used to generate a network map. The network map can take any form that allows mapping of network parameters for a wireless network to geographic locations. The network map data may be stored in one or more databases, for example, in any database storage format. Indicators may be generated using the uploaded user data, such as general network availability indicators for a geographical area. At step 306, a portion of, or the entire generated network map can be provided to other computing devices for use in planning network connections for a planned travel route, for example.

Figure 4:
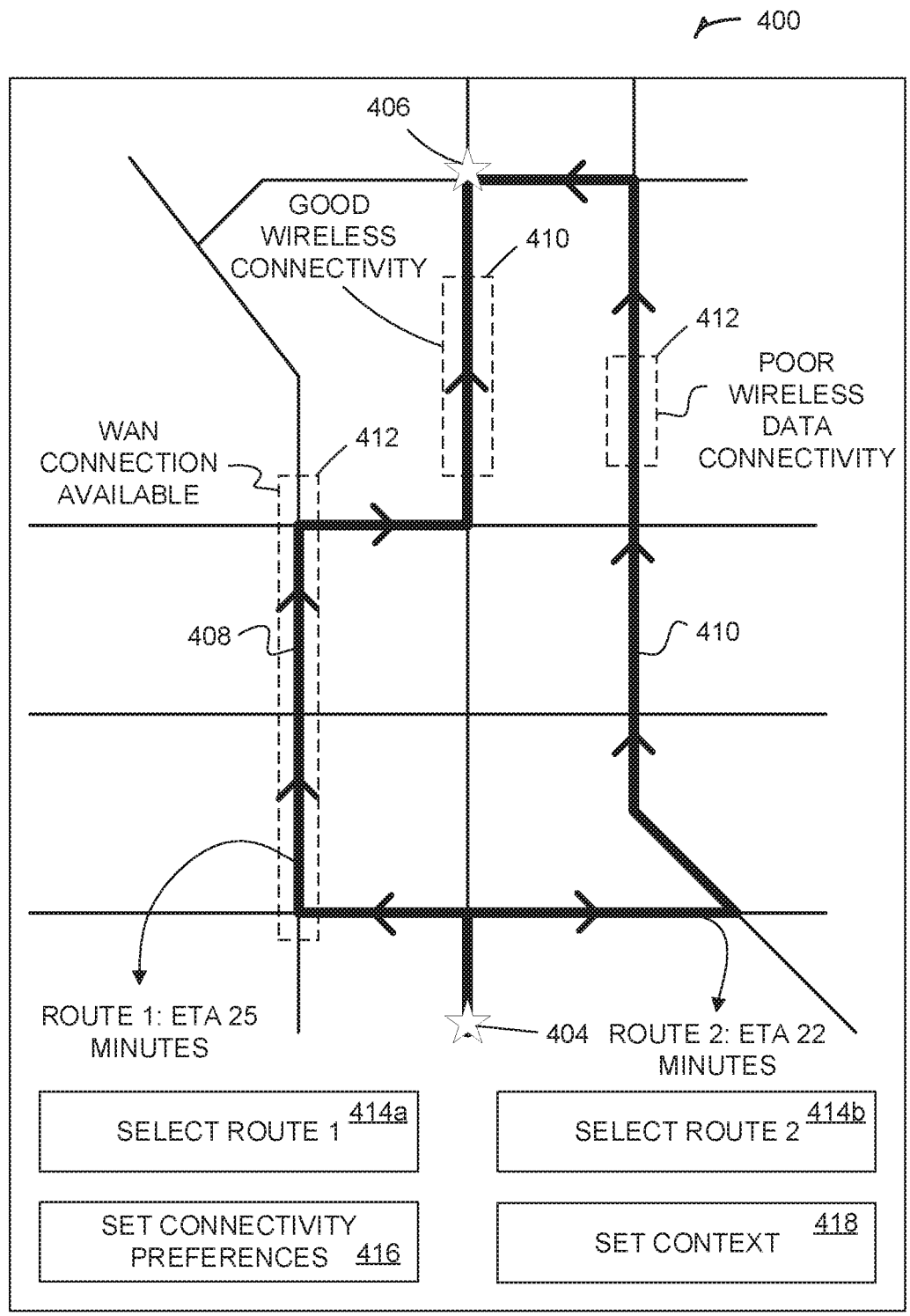
FIG. 4 is a client-side display illustrating a map that includes suggested routes generated using network map.

FIG. 4 is a diagram illustrating an example client-side user interface. The client-side user interface may include a display 400 configured to output a map 402 that illustrates a specified start location 404, an end location 406, a first suggested route 408, an second suggested route 410, and network indicators 412. The display may also include inputs 414a, 414b, 416, and 418. The network indicators 412 may be obtained from the network map and may provide indication to a user of one or more parameters of one or more wireless networks. For example, the indicators 412 can provide indication that a Wi-Fi® network is available, that no cellular voice connection is available, that no cellular data is available, that cellular data bandwidth is particularly high or low, or any other indication regarding any other network along the suggested routes 408 and 410.

The display 400 may allow a user to better select between suggested routes 408 and 410 by knowing whether or not particular networks or network types are available for the entire trip. For example, route 2 has a faster estimated travel time (22 minutes), but includes a portion of the route with poor wireless data connectivity. Route 1, while slower, does not suffer from the same data connectivity issues. Thus, if a user desires or has indicated to prefer good data connectivity for the entirety of the route, route 1 may be suggested as a better route even though it is slightly slower. A user may define any other further desires or requirements for travel, such as reliable voice connection, Wi-Fi® availability, or any other preferences.

The display 400 may only include indicators 412 of particular importance to a user so-as not to overwhelm a user with data. For example, a user may not need to know the connection quality of every channel of every network along a planned route. Because of this, the display 400 may only include indicators 412 that provide indication such as network outages or other important indications regarding the planned routes. The client-side device may select these indicators using indications from the servers 102, user preferences, or any other basis for selecting indicators 412 for the display 400.

The display 400 may include one or more inputs 414a and 414b that allow a user to interact with the suggested routes. The display 400 may also include one or more inputs to receive user preferences from a user of the user device. For example, the display 400 may include one or more inputs 416 for receiving user preferences and one or more inputs 418 for inputting current context data. For example, using the inputs 414a, 414b, 416, and 418, a user may be able to select routes, regenerate routes, input preferences for a route (e.g., good voice connection, good data connection, uninterrupted service, etc.), input context data such as current weather conditions, and the like. Current context data may also be provided automatically by the device using one or more sensors, applications, and the like. While illustrated as touchscreen buttons, a separate input device, such as a keyboard, mouse, keypad, or any other input device, may be used to receive input from a user.

Figure 5:
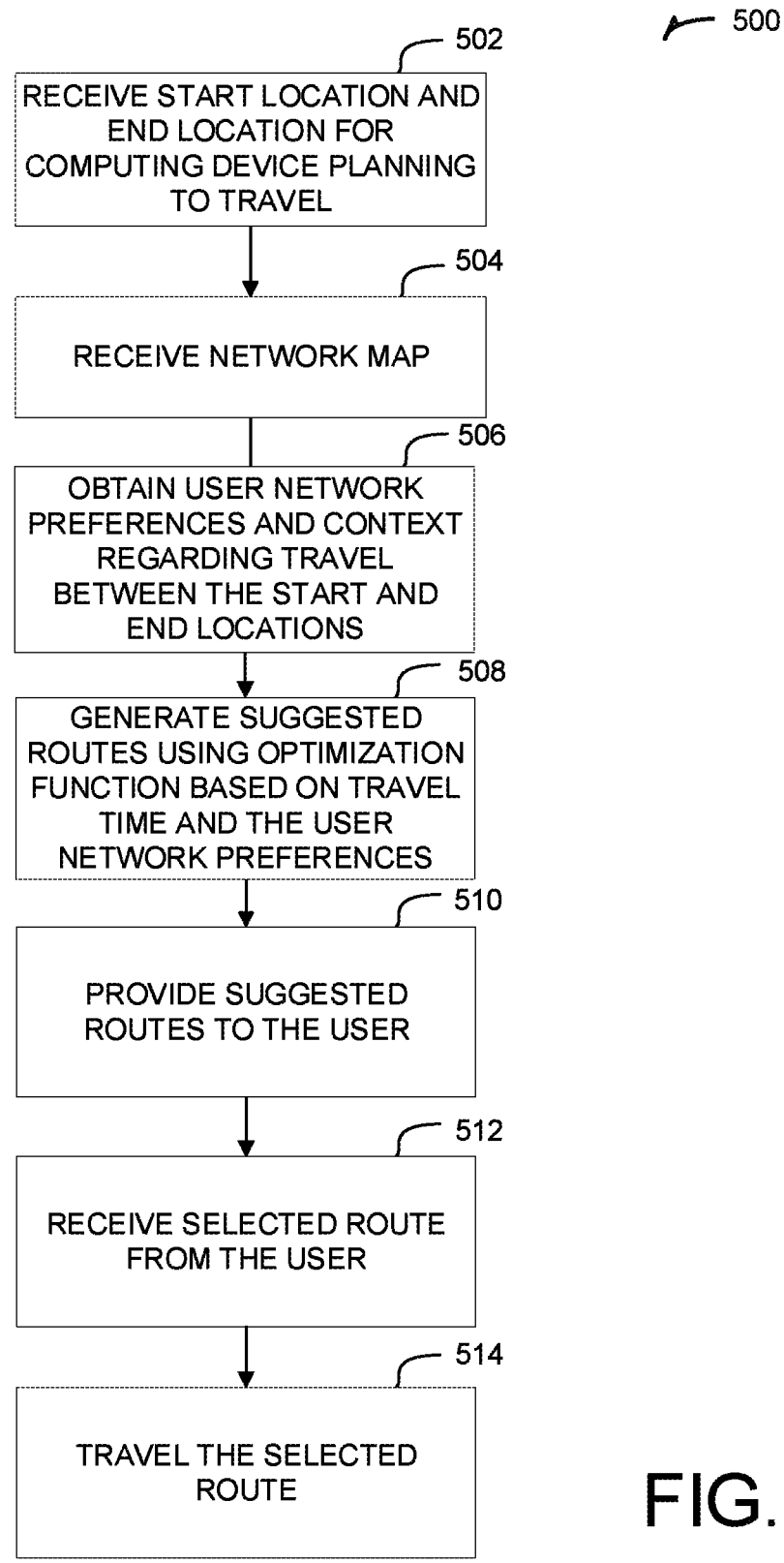
FIG. 5 is a flowchart illustrating a method of generating suggested routes using a network map.

FIG. 5 is a flowchart illustrating a method 500 for generating suggested routes using a network map. The method 500 can be executed by a server, such as the servers 102, or by a client-side computing device, such as the user devices 104, for example. At step 502, a start location and an end location are received. The end location may be entered by a user desiring to travel to the end location. The start location may be a current location of the device obtained using GPS, for example, or may be entered by a user planning to travel from the start location at a later time. At step 504, the network map is received. If method 500 is executed by a client-side computing device, the network map may be received from one or more servers over a wired or wireless network connection. If method 500 is executed by the server, the server may already have the network map as the server may have generated the network map, or the server may receive the network map from one or more other computing devices, such as another server.

The network map may include network parameters and/or indicators for both wireless networks and specific channels of the wireless networks. At steps 506, the system begins the process of generating suggested routes. The routes may be generated using an optimization function that accounts for both travel time as well as optimization of one or more network parameters (bandwidth, latency, throughput, etc.). The optimization function may be implemented using scalarization, a priori methods, a posteriori methods, interactive methods, or any other method of performing multi-objective optimization. The optimization function may also be weighted based on user preferences, which may be obtained at step 506. For example, a user may indicate that a continuous voice connection is of utmost importance in order to field important phone calls, or may desire a reliable data connection, in order to stream content to the computing device. In some examples, the user preferences and/or usage may be predicted based on historical preferences, machine learning, and/or any other information. For example, data from a user's calendar may be used to predict usage for the user. In an example, the user may have a schedule teleconference using VoIP during a likely travel time and thus, the route should include network channels that provide low latency. Current context data, such as time of day, day of the day, date, season, traffic conditions, weather conditions, device properties, and the like may be obtained at step 506. The context data may be obtained by user input, and/or automatically by the user device using one or more sensors, applications, or the like.

At step 508, one or more suggested routes may be generated based on travel time and the user specified network preferences. If a user has not specified network preferences, the suggested routes may be generated using default preferences. The default preferences may include no network preferences, or may include any other network preferences, such as an average voice connectivity for the route, for example.

Any desirable algorithm may be used to generate the suggested routes between the start location and the end location. In some examples, the system may initially generate routes that favor highways or other road conditions that generally provide faster travel time. The routes may then be adjusted based on information from the network map. For example, the routes may be adjusted to maximize a voice connection for the entire route, to maximize a data connection for the entire route, to ensure constant connection to a specific network, or any desires input by a user, for example.

In some examples, context data may be used when generating suggested routes. For example, a current context for a computing device may have been determined or received at step 506. This context may specify a time of day, day of the week, date, season, traffic indicators/conditions, weather conditions, travel velocity, device properties, and the like This current context may be used to match context data from the network map when generating the suggested routes. For example, the network map may specify a network parameter as one value for a given context, and another different value for a different context. The current context can thus be used to obtain data more relevant to the desired travel of the computing device, providing for improved suggested routes.

Optimizing network quality and/or connectivity may also include connections through other computing devices travelling along similar routes. For example, the system generating the suggested routes, such as the computing device or one or more servers, may receive planned routes from many other computing devices. The suggested route may be adjusted include one or more connections through one or more of the other computing devices that are travelling along a similar route to the planned route. For example, another computing device may be accessing a WiFi® network during a portion of the route similar to a portion of the route of the respective computing device. The network connection plan can include a connection to the WiFi® network through the other computing device for the respective portion of the planned route.

The final suggested routes may be determined by the computing device using any algorithm that implements one or more optimization functions to generate routes for users based on both travel time and on network quality and/or connectivity preferences. For example, the computing device may implement any form of machine learning to generate the suggested routes based on the current network map and on past data, for example. In some examples, the optimization function may be weighted to prioritize network quality over travel duration. At step 510, the suggested routes are provided to the computing device to display to a user, for example. At step 512, the user may select one of the suggested routes. At step 514, the computing device travels along the selected route. In some examples, the computing device may be part of an automated vehicle, in which case the selection of one of the suggested routes may be automated.

Figure 6:
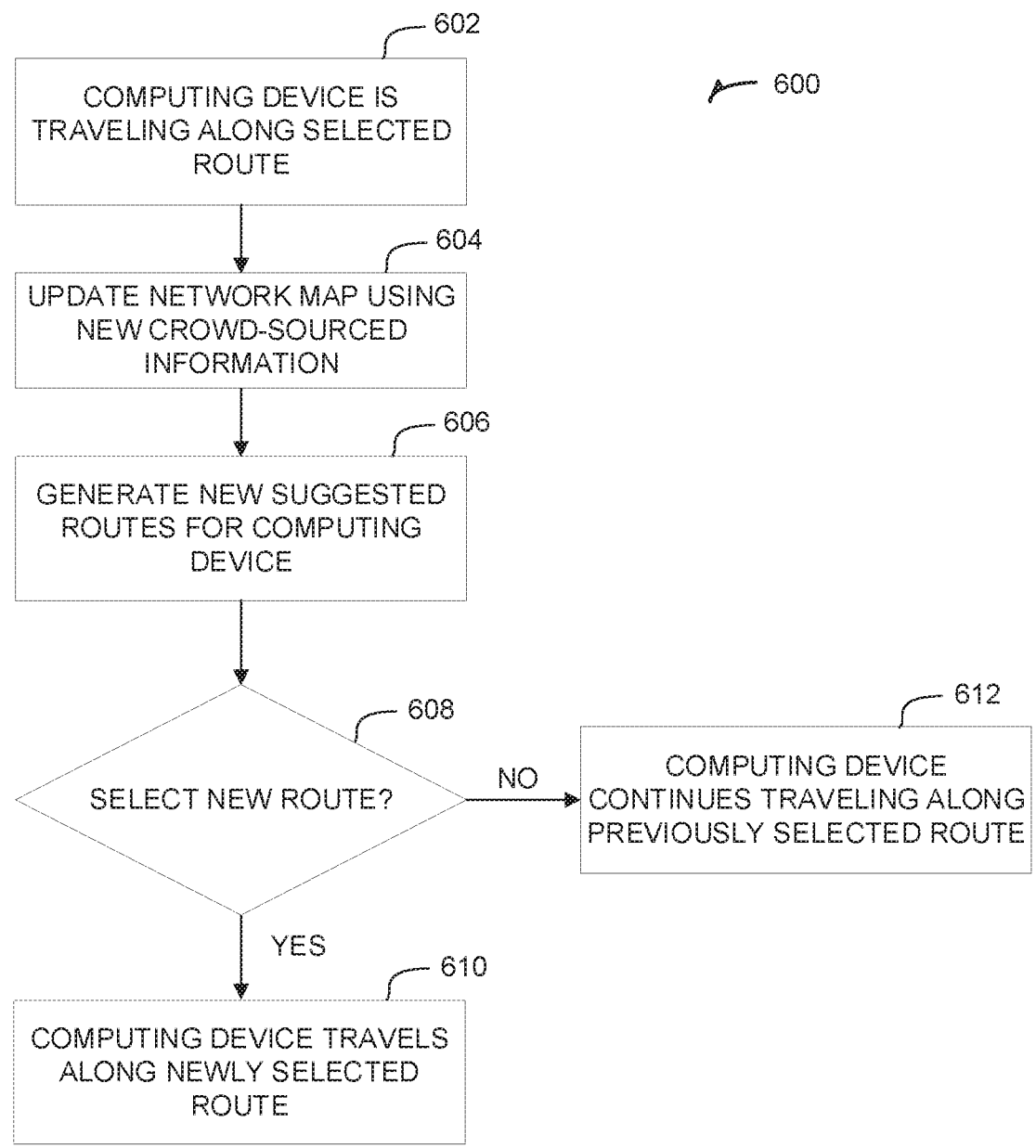
FIG. 6 is a flowchart illustrating a method of updating a suggested route while travelling a selected route.

FIG. 6 is a flowchart illustrating a method 600 of generating new suggested routes while a computing device is travelling a selected route. At step 602, the computing device is traveling along a selected route between a start location and an end location. While the device is travelling the selected route, the device may connect to one or more networks. The one or more networks may be specified by the suggested route, or may be automatically discovered by the device while travelling the suggested route. For example, the device may connect to a first network (e.g., a cellular network) for a first portion of the route and to a second network (e.g., a WiFi® network) for a second portion of the route. At step 604, the network map is updated using new crowd-sourced data. For example, a user device may indicate that a particular network and/or channel has recently become unavailable for a portion of the planned route. At step 606, based on the updated network map, one or more new suggested routes may be generated by the server or the computing device between the computing device's current location and the end location. For example, a new suggested route may be generated to avoid a recently specified unavailable network. A user may be alerted that a newly suggested route is available using any method. For example, an audible and/or visual alert may be generated informing the user of a newly suggested route. At step 608, the computing device or a user of the computing device may select to follow the suggested updated route. At step 610, if a new route was selected, the computing device travels according to the newly selected route. At step 612, if a new route was not selected (for example, a user can actively select not to accept an updated route), the computing device continues to travel according to the previously selected route.

Figure 7:
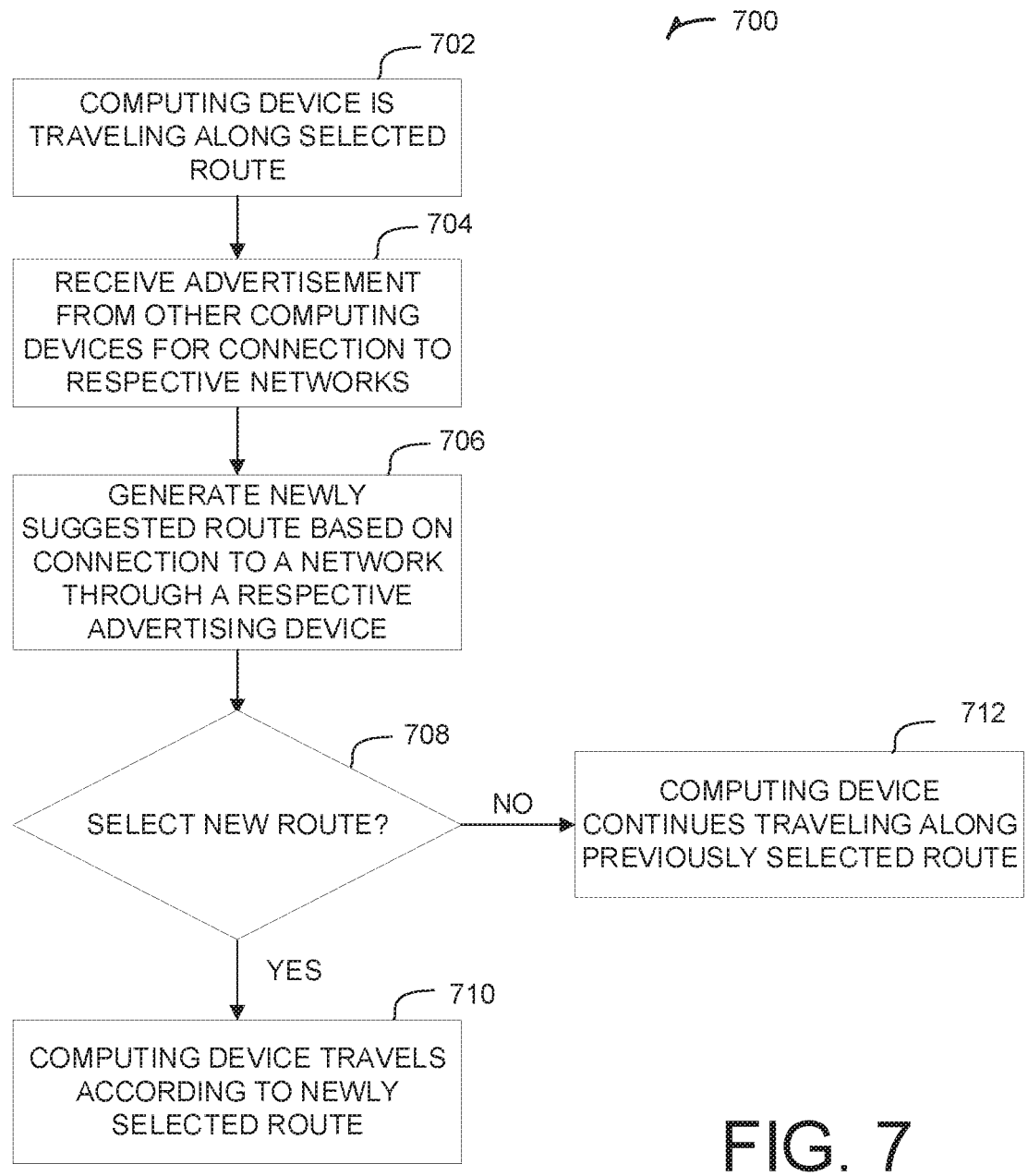
FIG. 7 is a flowchart illustrating a method of updating a suggested route while travelling a selected route.

FIG. 7 is a flowchart illustrating a method 700 of generating new suggested routes while the computing device is travelling a previously selected route. Method 700 may be executed by a server or the client-side device and may be executed in conjunction with the method 600, for example. At step 702, the computing device is traveling along a selected route between a start location and an end location. At step 704, while the computing device is travelling the selected route, one or more computing devices travelling similar routes may advertise connectability through the respective devices to one or more networks. Connection through these devices may not have originally been taken into account when generating the suggested routes. If one or more of these connections improves a connection quality, a new suggested route may be generated to spend more time traveling with the respective device. At step 706, a suggested route is generated to include more time with a respective device through which the computing device connects. A user may be alerted that a newly suggested route is available using any method. For example, an audible and/or visual alert may be generated informing the user of a newly suggested route. At step 708, the computing device or a user of the computing device may select to follow the suggested updated route. At step 710, if a new route was selected, the computing device travels according to the newly selected route. At step 712, if a new route was not selected (for example, a user can actively select not to accept an updated route), the computing device continues to travel according to the previously selected route.

As described herein, suggested routes may be generated based upon the suitability of the wireless resources for the intended wireless needs of the user devices. In some examples, the wireless needs may be determined based upon user input. In other examples, the wireless needs may be determined based upon a prediction of the wireless needs of the user device. In some examples, the prediction may be based upon a user's calendar. For example, if the calendar shows a VoIP call appointment, the system may infer that the user would like network resources that are optimal for VoIP calls. In other examples, the prediction may be based upon a machine-learned model that predicts the wireless needs of the user device based upon one or more features. Example features may include the time of day, day of the week, day of the year, the planned route, a calendar of the user (e.g., showing a VoIP meeting), a previous activity of the user (e.g., the wireless activity of the user prior to the route), and the like. Past feature data labelled with a wireless data usage type (e.g., VoIP, large file downloading, and the like) may be used to train the machine-learned model. Example machine-learning algorithms may include logistic regression, neural networks, decision forests, decision jungles, boosted decision trees, support vector machines, and the like. When determining a route, the current feature data of the user device may be applied to the model, and the model may make a prediction of the intended wireless needs of the device. The intended needs may be categories (e.g., low latency, high bandwidth, reliability above all else) that may then be matched to network segments based upon the network segment's scores for those categories. As noted, the scores may be based upon measurements of that category (e.g., latency measurements, bandwidth measurements, error rates, and the like) taken from a plurality of user devices. For example, the scores may be assigned via formulas that translate the network measurements into a score. An average score for all the devices may be utilized as the score for that particular segment.

Figure 8:
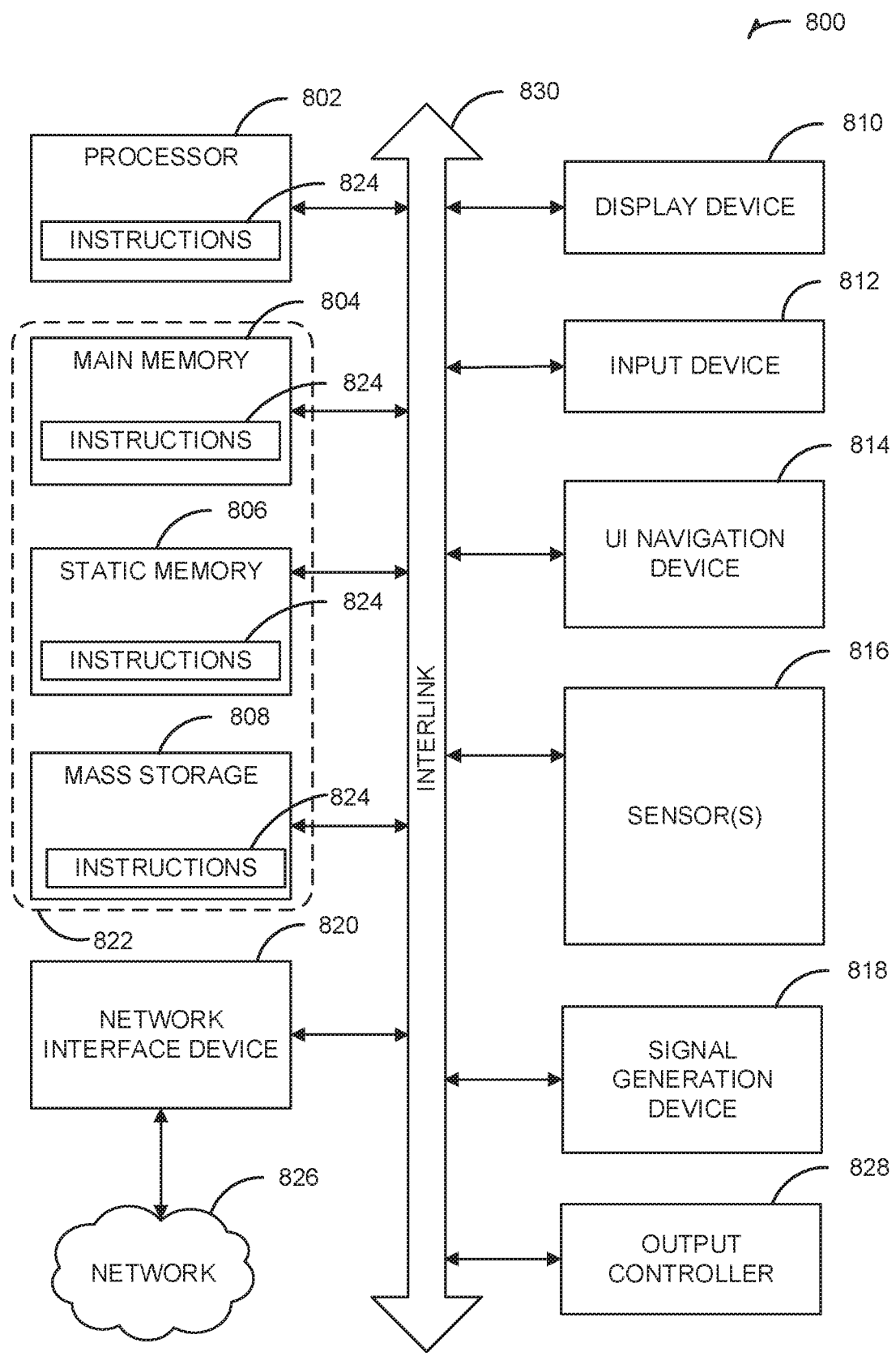
FIG. 8 is a block diagram illustrating an example of a machine upon which one or more embodiments may be implemented.

FIG. 8 illustrates a block diagram of an example machine 800 upon which any one or more of the techniques (e.g., methodologies) discussed herein may perform. For example, the machine 800 can be any one or more of the servers 102, and/or user devices 104a-104f. Examples, as described herein, may include, or may operate by, logic or a number of components, or mechanisms in the machine 800. Circuitry (e.g., processing circuitry) is a collection of circuits implemented in tangible entities of the machine 800 that include hardware (e.g., simple circuits, gates, logic, etc.). Circuitry membership may be flexible over time. Circuitries include members that may, alone or in combination, perform specified operations when operating. In an example, hardware of the circuitry may be immutably designed to carry out a specific operation (e.g., hardwired). In an example, the hardware of the circuitry may include variably connected physical components (e.g., execution units, transistors, simple circuits, etc.) including a machine readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuitry in hardware via the variable connections to carry out portions of the specific operation when in operation. Accordingly, in an example, the machine readable medium elements are part of the circuitry or are communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry at a different time. Additional examples of these components with respect to the machine 800 follow.

In alternative embodiments, the machine 800 may operate as a standalone device or may be connected (e.g., networked) to other machines. In a networked deployment, the machine 800 may operate in the capacity of a server machine, a client machine, or both in server-client network environments. In an example, the machine 800 may act as a peer machine in peer-to-peer (P2P) (or other distributed) network environment. The machine 800 may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

The machine (e.g., computer system) 800 may include a hardware processor 802 (e.g., a central processing unit (CPU), a graphics processing unit (GPU), a hardware processor core, or any combination thereof), a main memory 804, a static memory (e.g., memory or storage for firmware, microcode, a basic-input-output (BIOS), unified extensible firmware interface (UEFI), etc.) 806, and mass storage 808 (e.g., hard drive, tape drive, flash storage, or other block devices) some or all of which may communicate with each other via an interlink (e.g., bus) 830. The machine 800 may further include a display unit 810, an alphanumeric input device 812 (e.g., a keyboard), and a user interface (UI) navigation device 814 (e.g., a mouse). In an example, the display unit 810, input device 812 and UI navigation device 814 may be a touch screen display. The machine 800 may additionally include a storage device (e.g., drive unit) 808, a signal generation device 818 (e.g., a speaker), a network interface device 820, and one or more sensors 816, such as a global positioning system (GPS) sensor, compass, accelerometer, or other sensor. The machine 800 may include an output controller 828, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

Registers of the processor 802, the main memory 804, the static memory 806, or the mass storage 808 may be, or include, a machine readable medium 822 on which is stored one or more sets of data structures or instructions 824 (e.g., software) embodying or utilized by any one or more of the techniques or functions described herein. The instructions 824 may also reside, completely or at least partially, within any of registers of the processor 802, the main memory 804, the static memory 806, or the mass storage 808 during execution thereof by the machine 800. In an example, one or any combination of the hardware processor 802, the main memory 804, the static memory 806, or the mass storage 808 may constitute the machine readable media 822. While the machine readable medium 822 is illustrated as a single medium, the term "machine readable medium" may include a single medium or multiple media (e.g., a centralized or distributed database, and/or associated caches and servers) configured to store the one or more instructions 824.

The term "machine readable medium" may include any medium that is capable of storing, encoding, or carrying instructions for execution by the machine 800 and that cause the machine 800 to perform any one or more of the techniques of the present disclosure, or that is capable of storing, encoding or carrying data structures used by or associated with such instructions. Non-limiting machine readable medium examples may include solid-state memories, optical media, magnetic media, and signals (e.g., radio frequency signals, other photon based signals, sound signals, etc.). In an example, a non-transitory machine readable medium comprises a machine readable medium with a plurality of particles having invariant (e.g., rest) mass, and thus are compositions of matter. Accordingly, non-transitory machine-readable media are machine readable media that do not include transitory propagating signals. Specific examples of non-transitory machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 824 may be further transmitted or received over a communications network 826 using a transmission medium via the network interface device 820 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.16.4 family of standards, peer-to-peer (P2P) networks, among others. In an example, the network interface device 820 may include one or more physical jacks (e.g., Ethernet, coaxial, or phone jacks) or one or more antennas to connect to the communications network 826. In an example, the network interface device 820 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 800, and includes digital or analog communications signals or other intangible medium to facilitate communication of such software. A transmission medium is a machine readable medium.

The above description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

What is claimed is:

1. A method for generating suggested travel routes for computing devices using crowd-sourced network connectivity data, the method comprising:
   using one or more hardware processors:
   receiving a start location and an end location for a computing device planning to travel between the start and the end locations;
   receiving network quality data and context data from a plurality of user devices traveling along respective routes through a geographical area, the network quality data indicating one or more measured values for network parameters of respective wireless networks in the geographical area, and the context data indicating one or more of a temporal condition, a weather condition, a traffic condition, or a device condition occurring when the respective user device of the plurality of user devices obtains the network quality data;
   generating a network quality map indicative of one or more network parameters for the respective wireless networks for the geographical area using the network quality data received from the plurality of user devices, wherein the network quality map associates values of context data with values of the one or more network parameters using the received context data and the received network quality data;
   identifying current context data of the computing device:
   generating a suggested route between the start location and the end location using the network quality map, wherein the generating is based on a network connection parameter between the start location and the end location and the current context of the computing device; and
   transmitting the at least one suggested route to the computing device.

2. The method of claim 1, wherein generating the at least one suggested route comprises maximizing voice connection quality from the start location to the end location.

3. The method of claim 1, wherein generating the at least one suggested route comprises maximizing data streaming quality from the start location to the end location.

4. The method of claim 1, wherein generating the at least one suggested route comprises minimizing latency from the start location to the end location.

5. The method of claim 1, wherein generating the at least one suggested route comprises executing an optimization function that minimizes a travel duration and optimizes the network connection parameter between the start location and the end location.

6. The method of claim 5, wherein the optimization function is weighted to prioritize optimization of the network connection parameter over minimizing the travel duration.

7. The method of claim 1, further comprising:
   receiving one or more routes for one or more connectable devices through which the computing device can connect to one of the one or more wireless networks;

wherein optimizing the network connection parameter comprises planning at least one connection through the one or more connectable devices.

8. The method of claim 1, further comprising:
receiving a selected route of the at least one suggested route; and
regenerating the quality map while the computing device is traveling along the selected route based on new data received from the plurality of user devices or a new source; and
generating a new suggested route using the regenerated quality map while the computing device is traveling between the start location and the end location.

9. The method of claim 1, wherein the context data comprises data specifying at least one of a time of day, a day of the week, date, season, one or more traffic indicators, a travel velocity, one or more weather conditions, or one or more user device properties.

10. The method of claim 1, wherein receiving the network quality data from and measured by the plurality of user devices comprises one of:
receiving the network quality data directly from the plurality of user devices; or
receiving the network quality data from a server location, the server location configured to receive and compile the network quality data from the plurality of user devices.

11. A system for planning routes for computing devices using network connectivity data, the system comprising:
using one or more hardware processors:
one or more memories, storing instructions, which when executed, cause the one or more hardware processors to perform operations comprising:
receiving a start location and an end location for a computing device planning to travel between the start and the end locations;
receiving network quality data and context data from a plurality of user devices traveling along respective routes through a geographical area, the network quality data indicating one or more measured values for network parameters of respective wireless networks in the geographical area, and the context data indicating one or more of a temporal condition, a weather condition, a traffic condition, or a device condition occurring when the respective user device of the plurality of user devices obtains the network quality data;
generating a network quality map indicative of one or more network parameters for the respective wireless networks for the geographical area using the network quality data received from the plurality of user devices, wherein the network quality map associates values of context data with values of the one or more network parameters using the received context data and the received network quality data;
identifying current context data of the computing device:
generating a suggested route between the start location and the end location using the network quality map, wherein the generating is based on a network connection parameter between the start location and the end location and the current context of the computing device; and
transmitting the at least one suggested route to the computing device.

12. The system of claim 11, wherein the operations of optimizing the network connection parameter comprises maximizing voice connection quality from the start location to the end location.

13. The system of claim 11, wherein the operations of optimizing the network connection parameter comprises maximizing data streaming quality from the start location to the end location.

14. The system of claim 11, wherein the operations of optimizing the network connection parameter comprises minimizing a connection latency from the start location to the end location.

15. The system of claim 11, wherein the operations of generating the at least one suggested route comprises executing an optimization function that minimizes a travel duration and optimizes the network connection parameter between the start location and the end location.

16. The system of claim 15, wherein the optimization function is weighted to prioritize optimization of the network connection parameter over minimizing the travel duration.

17. The system of claim 11, wherein the context data comprises data specifying at least one of a time of day, a day of the week, date, season, one or more traffic indicators, a travel velocity, one or more weather conditions, or one or more user device properties.

18. A system for planning routes for computing devices, the system comprising:
means for receiving a start location and an end location for a computing device planning to travel between the start and the end locations;
means for receiving network quality data and context data from a plurality of user devices traveling along respective routes through a geographical area, the network quality data indicating one or more measured values for network parameters of respective wireless networks in the geographical area, and the context data indicating one or more of a temporal condition, a weather condition, a traffic condition, or a device condition occurring when the respective user device of the plurality of user devices obtains the network quality data;
means for generating a network quality map indicative of one or more network parameters for the respective wireless networks for the geographical area using the network quality data received from the plurality of user devices, wherein the network quality map associates values of context data with values of the one or more network parameters using the received context data and the received network quality data;
means for identifying current context data of the computing device:
means for generating a suggested route between the start location and the end location using the network quality map, wherein the generating is based on a network connection parameter between the start location and the end location and the current context of the computing device; and
means for transmitting the at least one suggested route to the computing device.

19. The system of claim 18, further comprising:
means for receiving a selected route of the at least one suggested route; and
means for regenerating the quality map while the computing device is traveling along the selected route based on new data received from the plurality of user devices or a new source; and
means for generating a new suggested route using the regenerated quality map while the computing device is traveling between the start location and the end location.

20. The system of claim 19, wherein the context data comprises data specifying at least one of a time of day, a day of the week, date, season, one or more traffic indicators, a travel velocity, one or more weather conditions, or one or more user device properties.

\* \* \* \* \*